United States Patent [19]

Sanders

[11] 4,292,183

[45] Sep. 29, 1981

[54] HIGH-DENSITY FLUID COMPOSITIONS

[75] Inventor: David C. Sanders, West Lafayette, Ind.

[73] Assignee: Great Lakes Chemical Corporation, West Lafayette, Ind.

[21] Appl. No.: 969,236

[22] Filed: Dec. 13, 1978

[51] Int. Cl.$^3$ .......................... E21B 43/00; C09K 3/00
[52] U.S. Cl. ........................... 252/8.55 R; 166/244 R
[58] Field of Search ............. 252/8.5 B, 8.5 A, 8.55 R; 166/244 R

[56] References Cited

U.S. PATENT DOCUMENTS

| | | | |
|---|---|---|---|
| 2,805,722 | 9/1957 | Morgan et al. | 252/8.55 X |
| 2,894,584 | 7/1959 | Birdwell et al. | 252/8.55 X |
| 3,126,950 | 3/1964 | Carlberg et al. | 252/8.55 X |
| 3,478,530 | 11/1969 | Aronson | 62/112 |
| 3,490,480 | 1/1970 | Parsons | 137/93 |
| 3,516,496 | 6/1970 | Barkman et al. | 166/281 |
| 3,625,889 | 12/1971 | Branscum | 252/8.5 |
| 3,993,570 | 11/1976 | Jackson et al. | 252/8.5 |

OTHER PUBLICATIONS

Gunzler et al., "Phase Behavior of Aqueous Lithium–Zinc–Calcium Halide Solutions," Proceedings of the Sixth Symposium on Thermophysical Properties, Pub. 1973, pp. 336–346.
Hudgins, "Developments in use of Dense Brines as Packer Fluids", Paper 926-6-G, API Spring Meeting, Southern District, Mar. 19, 1961, pp. 160–168.
Plonka, Article in *World Oil*, Apr. 1972, pp. 88 and 89.
Paul et al., Society of Petroleum Engineers of AIME, Paper No. SPE4655, 1973.
Wendorff, Society of Petroleum Engineers of AIME, Paper No. SPE4788, 1974.
Rike, Article in *Oil and Gas Journal*, Sep. 29, 1975.
Hudgins et al., Article in *Corrosion*, vol. 16, 1960, pp. 535t–538t.
Hudgins et al., Article in *Oil and Gas Journal*, vol. 59, Jul. 24, 1961, pp. 91–96.
Hudgins, Article in *J. Chem. Eng. Data*, vol. 9, No. 3, Jul. 1964, pp. 434–436.
Tuttle, SPE No. 4791, SPE-AIME Symposium on Formation Damage Conhol, New Orleans, LA, Feb. 7–8, 1974.
Chemical Abstracts, vol. 80, 1974, p. 273, Abstract No. 74711f.
Gufco Services Inc., Displacement and Gravel Pack Case History Using "Bromical HD", Dec. 27, 1977.
Gufco Services Inc., Price List-Bromical HD, Feb. 1, 1978.
Wright, Article in *World Oil*, Jun. 1978, pp. 53–56, 68, and 96.

*Primary Examiner*—Herbert B. Guynn
*Attorney, Agent, or Firm*—Kirkland & Ellis

[57] ABSTRACT

Clear, high-density fluids suitable for use as well completion, packing, and perforation media comprise aqueous solutions of zinc bromide and calcium bromide having densities lying in the range of about 14.5 up to about 18.0 pounds per gallon and measured pH's lying in the range of about 3.5 up to about 6.0. Optionally, such fluids may also comprise calcium chloride and/or a soluble film-forming amine-based corrosion inhibitor. Such fluids under conditions of ordinary use exhibit low corrosion rates and have crystallization points lying well below the range of temperatures under which they are used.

12 Claims, No Drawings

HIGH-DENSITY FLUID COMPOSITIONS

BACKGROUND OF THE INVENTION

1. Field of the Invention

This invention relates to well completion fluids and more particularly to a new high-density fluid that may be employed without excessive corrosion or undue crystallization.

2. Description of the Prior Art

Drilling fluids have conventionally been used to maintain control during perforation, completion, or workover operations in oil and gas wells. Drilling fluids that have heretofore been employed for such purposes include mud, saltwater, water, or oil. The use of these fluids during drilling operations has per se been generally satisfactory and has actually enhanced drilling efficacy. However, the same materials have been employed during completion and workover operations with undesirable consequences.

For example, use of drilling muds during well perforations has frequently resulted in plugging of the perforations. Solids present in such drilling fluids have caused plugging and have made the completion process unduly complex, expensive and unreliable. Similarly, use of drilling muds and other drilling fluids as packer fluids has resulted in unwanted settling of solids. Moreover, drilling media may be somewhat corrosive under long-term, static operating conditions thereby further rendering them unsuitable for use other than as transitory drilling aids.

In an effort to overcome the foregoing problems, one approach that has been suggested is the utilization of high density salt solutions. One such solution is disclosed in U.S. Pat. No. 3,126,950, issued Mar. 31, 1964. This patent describes water solutions of zinc chloride and calcium chloride and indicates they have utility as well completion fluids at densities ranging between about 11-14 pounds per gallon ("ppg"). While the patent indicates that in theory zinc chloride/calcium chloride solutions having densities as high as about 17 ppg may be prepared, the patentees state that they "have found that solutions containing sufficient $ZnCl_2$ to obtain densities above about 14 ppg cause significantly greater corrosion on the ferrous metals in the well." (Column 5, lines 29-32).

However, even with added corrosion inhibitors, these zinc chloride/calcium chloride solutions have had limited utility. Not only have severe downhole corrosion problems been encountered in their use, but significant corrosion of above ground equipment has also occurred as has injury to personnel. Moreover, the practical limitation of 14.0 ppg as in upper working limit for zinc chloride/calcium chloride solutions has made them unsuitable for deep drilling uses where higher densities are required to exert sufficient hydrostatic pressure to control the well.

Subsequently, it has been suggested that mixtures of calcium bromide and calcium chloride in water provide solids-free brines having densities as high as 15.1 ppg (Wendorff, "New Solids-Free High Density Brines Solve Many Workover and Completion Problems", Society of Petroleum Engineers Paper No. SPE 4788 (1974)). While the use of such calcium bromide/calcium chloride solutions has represented an improvement over the zinc chloride/calcium chloride solutions of U.S. Pat. No. 3,126,950, at densities approaching 15.1 ppg, the crystallization points of the calcium bromide/calcium chloride solutions are so high as to limit their utility to applications where low temperatures are not experienced. Moreover, the calcium bromide/calcium chloride mixtures cannot be safely or easily employed at densities in excess of 15.1 ppg (e.g., at densities as high as 18.0 ppg) required for higher pressured wells.

As a result, notwithstanding the demand for clear solutions as well completion and workover aids, the industry has continued to employ other approaches. Thus, emulsions and suspensions of materials such as iron carbonate have been employed. One popular fluid is a suspension of iron carbonate in a highly viscosified fluid. Such a system purports to be acid soluble such that, after use, acidification of the system results in dissolution of residual suspended iron carbonate particles. However, this approach has been unsatisfactory because up to about 8% of the iron carbonate is insoluble in acid, and difficulties have also been encountered in obtaining acid penetration in the difficult to get to areas in which the iron carbonate particles collect.

In short, the art has long sought a clear, high-density (i.e., up to about 18.0 ppg) corrosion controlled fluid suitable for use as a well completion, packing, and perforation medium, and the primary object of this invention is to provide such a fluid.

Another object is to provide a series of solutions which exhibit crystallization points which may be tailored to prevailing weather conditions on an economically advantageous basis.

A still further object is to provide a fluid of the character described having a low, controlled, corrosion rate.

A still further object is to provide a fluid of the character described which is not only non-corrosive when used in downhole applications but which is also free from above the ground corrosion problems and which may be safely used by personnel.

A still further object is to provide a fluid of the character described which is usable on a long term basis in oil and gas wells.

SUMMARY OF THE INVENTION

The foregoing and other objects, advantages and features of this invention may be achieved with clear, high-density fluids adapted for use as well completion, packing, and perforation media which comprise solutions of zinc bromide and calcium bromide in water having densities lying in the range of about 14.5 up to about 18.0 pounds per gallon and measured pH's lying in the range of about 3.5 up to about 6.0. Such solutions may also comprise calcium chloride, and the solution further advantageously comprises a soluble film-forming amine-based corrosion inhibitor.

DETAILED DESCRIPTION OF THE PREFERRED EMBODIMENT

As noted, those skilled in the art have long but unsuccessfully sought high-density clear fluids suitable for application as completion, packing and perforating fluids in oil and gas wells. More particularly, the art has sought a clear, noncorrosive fluid having a density lying in the range of 14.5 ppg up to about 18.0 ppg that may be safely employed for such purposes.

In accordance with this invention, it has been found that these objectives may be achieved with clear solutions of zinc bromide and calcium bromide in water having densities lying in the range of about 14.5 up to about 18.0 ppg, preferably about 15.1 ppg up to about 17.0 ppg, and with measured pH's lying in the range of about 3.5 up to about 6.0, preferably about 4.0 up to about 6.0.

So long as the important density and pH limitations are maintained, the relative amounts of the zinc bromide and calcium bromide constituents are not critical and may be determined by convenience, and many different combinations of amounts may be used.

Similarly, although it is essential in accordance with this invention that both zinc bromide and calcium bromide be employed as the primary constituents of the water solution, it has been found that portions of one or both these constituents may be replaced with calcium chloride so long as the density and pH ranges are maintained.

The following tables give exemplary amounts (expressed in pounds) of the constituents needed to produce 1 barrel of the solution in accordance with this invention. Table I gives the relative amounts of zinc bromide, calcium bromide and water needed to produce 1 barrel of solutions having densities of 14.5–18.0 ppg. Table II gives the amounts of zinc bromide, calcium bromide, calcium chloride, and water that may be employed in preparing 1 barrel of 15.5 to 18.0 ppg three-salt solution, and Table III gives the amounts of these constituents that may be used in making 1 barrel of 14.5 to 18.0 ppg three-salt blends.

TABLE I

| Density (ppg) | Pounds of Constituents Per Barrel of Solution | | |
|---|---|---|---|
| | Water | $ZnBr_2$ | $CaBr_2$ |
| 14.5 | 280.7 | 29.4 | 298.9 |
| 15.1 | 269.5 | 75.8 | 288.9 |
| 15.5 | 263.1 | 105.4 | 282.5 |
| 17.6 | 239.5 | 231.5 | 243.0 |
| 18.0 | 226.0 | 224.9 | 306.1 |

TABLE II

| Density (ppg) | Pounds of Constituents Per Barrel of Solution | | | |
|---|---|---|---|---|
| | Water | $ZnBr_2$ | $CaBr_2$ | $CaCl_2$ |
| 15.5 | 243.2 | 29.2 | 274.0 | 104.3 |
| 17.0 | 225.3 | 140.2 | 278.2 | 70.3 |
| 18.6 | 213.1 | 214.1 | 281.2 | 47.6 |

TABLE III

| Density (ppg) | Pounds of Constituents Per Barrel of Solution | | | |
|---|---|---|---|---|
| | Water | $ZnBr_2$ | $CaBr_2$ | $CaCl_2$ |
| 14.5 | 251.6 | 16.9 | 210.2 | 130.8 |
| 15.1 | 245.0 | 50.7 | 222.4 | 116.5 |
| 17.0 | 224.1 | 157.8 | 260.9 | 71.4 |
| 18.0 | 213.1 | 214.1 | 281.2 | 47.6 |

In all, the solutions of this invention comprise about 5–40 percent zinc bromide by weight; about 30–50 percent calcium bromide by weight; about 0–22 percent calcium chloride by weight; and 28–46 percent water by weight.

As noted, in accordance with this invention it is important that the blended materials exhibit pH's lying in the range of about 3.5 up to about 6.0, preferably about 4.0 up to about 6.0. Although the actual pH's of highly concentrated salt solutions cannot be accurately read using a pH meter, the relative pH's of several different highly concentrated salt solutions may be accurately compared. Moreover, the relative pH's may be accurately correlated to solution corrosion rates. Thus, the measured pH's of such highly concentrated solutions become a reliable monitoring method for determining the relative acidity of the fluids involved. The measured pH's are determined with a standard pH meter, the electrode of which is inserted into the solution to be measured. As used herein, the term "measured pH" refers to pH's determined in the foregoing manner.

Where it is necessary to adjust the measured pH, the adjustment may be carried out at substantially any time in accordance with this invention. Most conveniently the desired result is achieved by adjusting the pH of the 14.5 ppg (or other density) zinc bromide solution that is employed. Advantageously, this is done by adding calcium hydroxide in such amounts to the zinc bromide solution as to raise its pH to a level just below that at which zinc hydroxide begins to precipitate (i.e., to a measured pH of about 3.8 for 14.5 ppg zinc bromide solution). Thus, about 4.0 to 4.4 pounds, preferably about 4.2 pounds, of calcium hydroxide are added per barrel of 14.5 ppg zinc bromide.

Thereafter, the pH-adjusted zinc bromide solution is blended with calcium bromide and/or chloride solutions, with the addition of calcium bromide and/or calcium chloride solids as disclosed herein, so that the measured pH of the blended solution is maintained in the desired pH range. However, the pH may be adjusted at any convenient point so long as the measured pH of the solution to be used falls in the desired range.

Solutions of the foregoing type may be employed in the usual and customary fashion as well completion, packing, and perforation media without undue corrosion and/or risk of injury to personnel. However, the level of corrosion and degree of risk may be further reduced by incorporating in the fluids a small but effective amount of a soluble corrosion inhibitor. In accordance with this invention, it has been found that film-forming amine-based corrosion inhibitors have a special utility, with materials available from Petrolite, Inc. under the mark "TRETOLITE KW-12" and from Dresser Industries uner the mark "MAGCOBAR 101" being prefered.

The corrosion inhibitor preferably is employd at a level of at least about 1,000 ppm and peferably at least about 5,000 ppm. No operativ upper limit is believed to exist with respect to uch corrosion inhibitors other than limits of solubility in the solution.

For ease of manufacturing, it is preferred that any corrosion inhibitors be added to the zinc bromide solution after pH adjustment although the point at which the corrosion inhibitor is added is not critical.

A wide variety of mixing steps and procedures may be employed to achieve solutions of the desired densities. Thus, standard solutions such as 14.2 ppg calcium bromide and 14.5 ppg zinc bromide may be mixed in varying amounts with densities being adjusted by the further addition of calcium bromide and/or zinc bromide salts. Also, as noted all or a part of one or more of the zinc bromide and calcium bromide may be partially supplanted by solid calcium chloride.

The following examples give several of the many possible blending procedures that may be employed to obtain fluids having densities lying in the range of 14.5–18.0 ppg in accordance with this invention.

EXAMPLE I

Calcium bromide solution (14.2 ppg) and pH-adjusted zinc bromide solution (14.5 ppg) corrosion inhibited with 5000 ppm "TRETOLITE KW-12" were mixed, followed by addition of solid 91% calcium bromide in accordance with the respective volumes and amounts set forth in Table IV.

TABLE IV

| $CaBr_2/ZnBr_2$ at 60° F. Desired Density | Specific Gravity | Barrels 14.2 lb/gal $CaBr_2$ | Barrels 14.5 lb/gal $ZnBr_2$ | Pounds 91% $CaBr_2$ |
|---|---|---|---|---|
| 14.5 | 1.74 | .8833 | .0900 | 27.41 |
| 14.6 | 1.75 | .8565 | .1067 | 37.41 |
| 14.7 | 1.76 | .8223 | .1318 | 58.65 |
| 14.8 | 1.77 | .7859 | .1531 | 59.67 |
| 14.9 | 1.79 | .7555 | .1788 | 66.33 |
| 15.0 | 1.80 | .7109 | .2079 | 73.08 |
| 15.1 | 1.81 | .6859 | .2322 | 83.71 |
| 15.2 | 1.82 | .6530 | .2547 | 93.84 |
| 15.3 | 1.83 | .6239 | .2722 | 104.74 |
| 15.4 | 1.85 | .5921 | .2995 | 111.25 |
| 15.5 | 1.86 | .5632 | .3228 | 118.48 |
| 15.6 | 1.87 | .5287 | .3413 | 132.43 |
| 15.7 | 1.88 | .4964 | .3627 | 142.43 |
| 15.8 | 1.90 | .4651 | .3912 | 147.98 |
| 15.9 | 1.91 | .4268 | .4233 | 156.27 |
| 16.0 | 1.92 | .3944 | .4513 | 161.95 |
| 16.1 | 1.93 | .3515 | .4852 | 171.08 |
| 16.2 | 1.94 | .3205 | .5083 | 179.63 |
| 16.3 | 1.95 | .2893 | .5250 | 192.37 |
| 16.4 | 1.97 | .2610 | .5496 | 198.37 |
| 16.5 | 1.98 | .2254 | .5690 | 212.06 |
| 16.6 | 1.99 | .2034 | .5862 | 218.92 |
| 16.7 | 2.00 | .1776 | .6058 | 226.55 |
| 16.8 | 2.01 | .1467 | .6372 | 230.03 |
| 16.9 | 2.03 | .0928 | .6842 | 238.49 |
| 17.0 | 2.04 | .0587 | .7093 | 247.04 |
| 17.1 | 2.05 | .0229 | .7241 | 263.58 |
| 17.2 | 2.06 | .0060 | .7449 | 265.12 |
| 17.3 | 2.07 | — | .7552 | 266.66 |
| 17.4 | 2.09 | — | .7548 | 271.13 |
| 17.5 | 2.10 | — | .7447 | 281.51 |
| 17.6 | 2.11 | — | .7356 | 291.24 |
| 17.7 | 2.12 | — | .7263 | 301.08 |
| 17.8 | 2.13 | — | .7181 | 310.25 |
| 17.9 | 2.14 | — | .7098 | 319.52 |
| 18.0 | 2.16 | — | .6890 | 336.42 |

The effect of temperature on the density of zinc bromide/calcium bromide fluid blends in accordance with Example I are given in Table V. Selected samples of zinc bromide/calcium bromide fluid were examined for density variation over a temperature range of 77° to 230° F., and the results are presented in Table V.

TABLE V

Density vs. Temperature $ZnBr_2/CaBr_2$ Fluids

| Temperature (°F.) | Density (lb./gal.) | | | | |
|---|---|---|---|---|---|
| 77 | 15.50 | 15.97 | 16.62 | 17.21 | 17.65 |
| 122 | 15.36 | 15.78 | 16.46 | 17.05 | 17.48 |
| 167 | 15.17 | 15.61 | 16.27 | 16.84 | 17.29 |
| 212 | 14.97 | 15.45 | 16.09 | 16.66 | 17.10 |
| 230 | 14.91 | 15.35 | 16.00 | 16.58 | 17.03 |

Table VI gives freezing points for calcium bromide/-zinc bromide fluids having densities lying in the range of 14.5–18.0.

TABLE VI

Freezing Points of $ZnBr_2/CaBr_2$ Solutions

| Density | Freezing Point (°F.) |
|---|---|
| 14.2 | 2 |
| 15.5 | −20 |
| 17.0 | 20 |
| 17.5 | 55 |

EXAMPLE II

An alternative technique for obtaining fluids having densities in the range of 15.1–18.0 ppg involves blending 14.2 ppg calcium bromide, 14.5 ppg zinc bromide, 94% calcium chloride solid and 91% calcium bromide solid in accordance with the respective amounts set forth in Table VII. The procedure involves mixing calcium bromide solution (14.2 ppg) and pH-adjusted, corrosion inhibited zinc bromide solution (14.5 ppg) followed by addition of solid 94% calcium chloride. After about 30 minutes (during which the bulk of the calcium chloride dissolves), 91% calcium bromide solids are added. Density measurements were made at 70° F.

TABLE VII

| DESIRED DENSITY lb./gal. | BARRELS 14.2 lb./gal. $CaBr_2$ | BARRELS 14.5 lb./gal. $ZnBr_2$ | POUNDS 94% $CaCl_2$ | POUNDS 91% $CaBr_2$ |
|---|---|---|---|---|
| 15.1 | .8647 | .0000 | 113.40 | 5.13 |
| 15.2 | .8348 | .0226 | 111.13 | 15.60 |
| 15.3 | .8050 | .0452 | 108.86 | 26.08 |
| 15.4 | .7752 | .0678 | 106.59 | 36.55 |
| 15.5 | .7454 | .0904 | 104.32 | 47.02 |
| 15.6 | .7156 | .1130 | 102.05 | 57.50 |
| 15.7 | .6858 | .1357 | 99.78 | 67.97 |
| 15.8 | .6560 | .1583 | 97.51 | 78.44 |
| 15.9 | .6261 | .1809 | 95.24 | 88.91 |
| 16.0 | .5963 | .2035 | 92.97 | 99.12 |
| 16.1 | .5665 | .2261 | 90.70 | 109.86 |
| 16.2 | .5367 | .2487 | 88.43 | 120.33 |
| 16.3 | .5069 | .2713 | 86.16 | 130.81 |
| 16.4 | .4770 | .2939 | 83.89 | 141.28 |
| 16.5 | .4472 | .3166 | 81.62 | 151.75 |
| 16.6 | .4174 | .3392 | 79.35 | 162.23 |
| 16.7 | .3876 | .3618 | 77.08 | 172.70 |
| 16.8 | .3578 | .3844 | 74.81 | 183.17 |
| 16.9 | .3280 | .4070 | 72.54 | 193.65 |
| 17.0 | .2982 | .4296 | 70.27 | 204.12 |
| 17.1 | .2683 | .4522 | 68.00 | 214.59 |
| 17.2 | .2385 | .4748 | 65.73 | 225.07 |
| 17.3 | .2087 | .4974 | 63.46 | 235.54 |
| 17.4 | .1789 | .5200 | 61.19 | 246.01 |
| 17.5 | .1491 | .5427 | 58.92 | 256.48 |
| 17.6 | .1193 | .5653 | 56.65 | 266.96 |
| 17.7 | .0895 | .5879 | 54.38 | 277.43 |
| 17.8 | .0596 | .6105 | 52.11 | 287.90 |
| 17.9 | .0298 | .6331 | 49.84 | 298.38 |
| 18.0 | — | .6559 | 47.57 | 308.97 |

Solutions blended in accordance with this procedure have crystallization points lying in the range of about 45°–50° F.

EXAMPLE III

Another variation for obtaining 15.1 ppg to 18.0 ppg zinc bromide/calcium bromide/calcium chloride solutions involves blending 15.1 ppg calcium bromide/calcium chloride with 18.0 ppg zinc bromide/calcium bromide. The latter is obtained by blending 0.6890 barrels of pH-adjusted, corrosion inhibited 14.5 ppg zinc bromide and 336.42 pounds of 91% solid calcium bromide. The respective amounts employed in accordance with this example are given in Table VIII.

TABLE VIII

| Density Desired (lb./gal) | Barrels 15.1 lb./gal CaBr$_2$/CaCl$_2$ | Barrels 18.0 lb./gal ZnBr$_2$/CaBr$_2$ |
| --- | --- | --- |
| 15.1 | 1.000 | — |
| 15.2 | .966 | .034 |
| 15.3 | .931 | .069 |
| 15.4 | .897 | .103 |
| 15.5 | .862 | .138 |
| 15.6 | .828 | .172 |
| 15.7 | .793 | .207 |
| 15.8 | .759 | .241 |
| 15.9 | .724 | .276 |
| 16.0 | .690 | .310 |
| 16.1 | .655 | .345 |
| 16.2 | .621 | .379 |
| 16.3 | .586 | .414 |
| 16.4 | .552 | .448 |
| 16.5 | .517 | .483 |
| 16.6 | .483 | .517 |
| 16.7 | .448 | .552 |
| 16.8 | .414 | .586 |
| 16.9 | .379 | .621 |
| 17.0 | .345 | .655 |
| 17.1 | .310 | .690 |
| 17.2 | .276 | .724 |
| 17.3 | .241 | .759 |
| 17.4 | .207 | .793 |
| 17.5 | .172 | .828 |
| 17.6 | .138 | .862 |
| 17.7 | .103 | .897 |
| 17.8 | .069 | .931 |
| 17.9 | .034 | .966 |
| 18.0 | — | 1.000 |

EXAMPLE IV

A still further blending approach involves mixing 17.0 ppg pH-adjusted, corrosion inhibited calcium bromide/zinc bromide solution (comprising about 35–40% by weight zinc bromide and about 21–26% by weight calcium bromide) with 14.2 ppg calcium bromide or 14.2 ppg calcium bromide/calcium chloride solution as desired. Generally, where higher relative crystallization points are not a problem, it is preferred to employ calcium bromide/calcium chloride solutions. However, where lower crystallization points are important, then the more expensive calcium bromide solutions should be used.

Where it is desired to obtain densities in excess of 17.0 ppg, the density of the 17.0 calcium bromide/zinc bromide solution may be raised by adding solid calcium bromide or, where the crystallization point is not critical, the calcium bromide may in part be replaced by calcium chloride solids. The procedure of Example IV is generally preferred in accordance with this invention since, for applications at 17.0 ppg and below, only fluids need be blended in the field.

The following example demonstrates use of the fluids in accordance with this invention in well completion, packing, and perforation.

EXAMPLE V

Zinc bromide/calcium bromide fluid (15.8 ppg) was employed in an 8438 foot well drilled at South Marsh Island, offshore Louisiana. After the well was cased it was washed out with sea water. A 20 bbl gel-water spacer was pumped ahead of the high density solution of this invention and the hole displaced of sea water.

After running cased hole logs, the bottom zone was perforated, acidized and gravel-packed. Approximately 28 bbls of high density fluid was lost to the formation during this operation.

Next, the upper zone was perforated, acidized, and gravel packed. About 30 bbls of solution were lost into the upper zone during this operation.

After setting an isolation packer above the gravel packs and running dual tubing strings in the hole, the fluid was displaced with sea water, and a total 450 bbls. of solution were recovered.

A dual completion producing (sand-free) from two essentially nondamaged zones was obtained.

TOXICITY

Toxicity data for the high density fluids in accordance with this invention demonstrate that they may be safely employed. More particularly, while zinc bromide and calcium bromide are both primary eye irritants, neither is a primary skin irritant. Table IX contains LD$_{50}$ Toxicity Data (i.e., the lethal dosage at which 50% of the test animals die) from the 1976 Registry of Toxic Effects of Chemical Substances (United States Department of Health, Education and Welfare), the Merck Index, or based on tests performed by International Research & Development Corporation.

TABLE IX

| | Mammalian Toxicity LD$_{50}$ | | |
| --- | --- | --- | --- |
| Type | Zinc Bromide | Calcium Bromide | Calcium Chloride |
| Oral - Rats | 1047 mg/kg | 4068 mg/kg | 1000 mg/kg |
| Dermal - Rats | >2000 mg/kg | >2000 mg/kg | — |
| Inhalation - Rats | >200 mg/l | >200 mg/l | — |

CORROSION

The effects of the presence of the film-forming amine-base corrosion inhibitor on the corrosion rates of the solutions of this invention are demonstrated in the following comparative examples. Corrosion rates were determined by suspending weighed mild steel coupons (2 inch by ½ inch by 1/16 inch) by glass hangers totally submerged in 275 ml of test fluid contained in sealed 400 ml stainless steel test cells. These cells were maintained at 250° F. (Blue M Forced Draft Oven) for seven days. After the test coupons were removed from the fluid, any loose corrosion products were removed, and the coupons were rinsed with water, dried, weighed, and examined for pitting.

The corrosion rates in mils of penetration per year ("MPY") were determined using the following formula.

$$MPY = \frac{534 \times \text{Coupon Weight Loss (mg)}}{\text{Coupon Density (g/cc)} \quad \text{Test Length (hours)} \quad \text{Coupon Area (sq. inches)}}$$

Corrosion rates were determined in the foregoing manner for equivalent blends lying in the density range of this invention both with and without corrosion inhibitor. These data, reported in Table X, reveal that, even without a corrosion inhibiting additive, the solutions of this invention are not highly corrosive and that with inhibitors, corrosion rates of less than 5.0 MPY are obtained.

TABLE X

Corrosion Rates of Zinc Bromide/Calcium Bromide Solutions

| Density | Temperature | With Inhibitor (MPY) | Without Inhibitor (MPY) |
|---|---|---|---|
| 15.5 | 250° F. | 4.5 | 9 |
| 16.0 | 250° F. | 2.5 | 10 |
| 16.5 | 250° F. | 2.4 | 10 |
| 17.0 | 250° F. | 1.6 | 9 |
| 17.5 | 250° F. | 1.6 | 11 |
| 18.0 | 250° F. | 1.5 | 9 |

In accordance with this invention there are provided clear high-density fluids which may be safely and effectively employed as well completion, packing, and perforating media. They are relatively non-corrosive to equipment and personnel and are stable and may be satisfactorily used on a long-term basis. These solutions have fulfilled a long-felt want in the well drilling field for clear solutions having densities in excess of 15.1 ppg which can be safely employed.

What is claimed is:

1. A clear, high-density fluid adapted for use as a well completion, packing, and perforation medium consisting of a solution of zinc bromide and calcium bromide in water having a density lying in the range of about 14.5 up to about 18.0 pounds per gallon and a measured pH lying in the range of about 3.5 up to about 6.0;

2. A clear, high-density fluid, as claimed in claim 1, having a measured pH of about 4.0 up to about 6.0.

3. A clear, high-density fluid, as claimed in claim 1, having a density of about 15.1 to 17.0 pounds per gallon.

4. A clear, high-density fluid adapted for use as a well completion, packing, and perforation medium consisting of a solution of zinc bromide, calcium bromide and calcium chloride in water having a density lying in the range of about 15.1 up to about 18.0 pounds per gallon and having a measured pH lying in the range of about 4.0 up to about 6.0.

5. A clear, high-density fluid adapted for use as a well completion, packing, and perforation medium comprising:
   a solution of zinc bromide and calcium bromide in water having a density lying in the range of about 14.5 up to about 18.0 pounds per gallon and a measured pH lying in the range of about 3.5 up to about 6.0; and
   a soluble, film-forming amine-based corrosion inhibitor.

6. A clear, high density fluid, as claimed in claim 5, wherein the solution further comprises calcium chloride.

7. A clear, high-density fluid, as claimed in claim 5, having a measured pH of about 4.0 up to about 6.0.

8. A clear, high-density fluid, as claimed in claim 5, having a density of about 15.1 to 17.0 pounds per gallon.

9. A clear, high-density fluid, as claimed in claim 5, wherein the corrosion inhibitor is provided at a level of about 1000 up to about 5000 parts per million.

10. In a method of completion or workover of wells wherein a high-density fluid is injected into the well to exert sufficient hydrostatic pressure to control the well, the improvement comprising employing as the high-density fluid a clear solution comprising zinc bromide and calcium bromide in water having a density lying in the range of about 14.5 up to about 18.0 pounds per gallon and a measured pH lying in the range of about 3.5 up to about 6.0.

11. A method, as claimed in claim 10, wherein the solution further comprises calcium chloride.

12. A method, as claimed in claim 11, wherein the solution has a density lying in the range of about 15.1 up to 18.0 and a measured pH of about 4.0 up to about 6.0.

* * * * *

UNITED STATES PATENT AND TRADEMARK OFFICE
CERTIFICATE OF CORRECTION

PATENT NO. : 4,292,183

DATED : September 29, 1981

INVENTOR(S) : David C. Sanders

It is certified that error appears in the above—identified patent and that said Letters Patent is hereby corrected as shown below:

Column 3, line 37, "226.0" should read --225.0--.

Column 4, line 46, "employd" should read --employed--.

Column 4, line 48, "operativ" should read --operative--.

Column 4, line 49, "uch" should read --such--.

Signed and Sealed this

Twenty-third Day of August 1983

[SEAL]

Attest:

GERALD J. MOSSINGHOFF

Attesting Officer    Commissioner of Patents and Trademarks